United States Patent
Takada et al.

(10) Patent No.: US 8,421,411 B2
(45) Date of Patent: *Apr. 16, 2013

(54) RESONANCE TYPE NON-CONTACT CHARGING DEVICE

(75) Inventors: Kazuyoshi Takada, Kariya (JP); Sadanori Suzuki, Kariya (JP); Kenichi Nakata, Kariya (JP); Shimpei Sakoda, Kariya (JP); Yukihiro Yamamoto, Kariya (JP); Shinji Ichikawa, Toyota (JP); Tetsuhiro Ishikawa, Miyoshi (JP)

(73) Assignees: Kabushiki Kaisha Toyota Jidoshokki, Kariya-shi (JP); Toyota Jidosha Kabushiki Kaisha, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/492,372

(22) Filed: Jun. 8, 2012

(65) Prior Publication Data
US 2012/0242287 A1    Sep. 27, 2012

Related U.S. Application Data

(63) Continuation of application No. 13/132,240, filed as application No. PCT/JP2009/071371 on Dec. 24, 2009, now Pat. No. 8,212,520.

(30) Foreign Application Priority Data

Dec. 24, 2008 (JP) .................... 2008-328830

(51) Int. Cl.
*H02J 7/00* (2006.01)
*B60L 9/00* (2006.01)
*B60W 20/00* (2006.01)

(52) U.S. Cl.
USPC ........... 320/108; 320/109; 191/10; 180/65.27

(58) Field of Classification Search ................. 320/108, 320/109; 191/10; 180/65.21, 65.27, 65.29, 180/65.31, 65.1; 455/41.1; 903/907
See application file for complete search history.

(56) References Cited

U.S. PATENT DOCUMENTS 6,157,162 A    12/2000 Hayashi et al.
7,741,734 B2    6/2010 Joannopoulos et al.
(Continued)

FOREIGN PATENT DOCUMENTS

AU    2006269374 B2    1/2007
AU    2006269374 C1    1/2007
(Continued)

OTHER PUBLICATIONS

Kurs et al., "Wireless Power Transfer via Strongly Coupled Magnetic Resonances," *Science*, vol. 317, pp. 83-86, Jul. 6, 2007.
(Continued)

*Primary Examiner* — Richard V Muralidar
(74) *Attorney, Agent, or Firm* — Oliff & Berridge, PLC

(57) ABSTRACT

A resonance type non-contact charging device includes a high frequency power source, a primary side resonant coil, a secondary side resonant coil, a charger, a secondary battery, and a stop control unit. The primary side resonant coil receives supply of high frequency electric power from the high frequency power source. The secondary side resonant coil is arranged apart from the primary side resonant coil in a non-contact manner. The secondary side resonant coil receives electric power from the primary side resonant coil through magnetic field resonance between the primary side resonant coil and the secondary side resonant coil. The charger receives supply of high frequency electric power from the secondary side resonant coil. The secondary battery is connected to the charger. The stop control unit stops the high frequency power source before stopping the charger when charging is to be stopped.

19 Claims, 3 Drawing Sheets

U.S. PATENT DOCUMENTS

| | | | |
|---|---|---|---|
| 8,039,995 B2 * | 10/2011 | Stevens et al. | 307/104 |
| 8,212,520 B2 * | 7/2012 | Takada et al. | 320/108 |
| 8,248,027 B2 * | 8/2012 | Sakoda et al. | 320/108 |
| 2007/0222542 A1 | 9/2007 | Joannopoulos et al. | |
| 2008/0278264 A1 | 11/2008 | Karalis et al. | |
| 2009/0195332 A1 | 8/2009 | Joannopoulos et al. | |
| 2009/0195333 A1 | 8/2009 | Joannopoulos et al. | |
| 2009/0224856 A1 | 9/2009 | Karalis et al. | |
| 2009/0267709 A1 | 10/2009 | Joannopoulos et al. | |
| 2009/0267710 A1 | 10/2009 | Joannopoulos et al. | |
| 2010/0096934 A1 | 4/2010 | Joannopoulos et al. | |
| 2010/0102639 A1 | 4/2010 | Joannopoulos et al. | |
| 2010/0102640 A1 | 4/2010 | Joannopoulos et al. | |
| 2010/0102641 A1 | 4/2010 | Joannopoulos et al. | |
| 2010/0117455 A1 | 5/2010 | Joannopoulos et al. | |
| 2010/0117456 A1 | 5/2010 | Karalis et al. | |
| 2010/0123353 A1 | 5/2010 | Joannopoulos et al. | |
| 2010/0123354 A1 | 5/2010 | Joannopoulos et al. | |
| 2010/0123355 A1 | 5/2010 | Joannopoulos et al. | |
| 2010/0127573 A1 | 5/2010 | Joannopoulos et al. | |
| 2010/0127574 A1 | 5/2010 | Joannopoulos et al. | |
| 2010/0127575 A1 | 5/2010 | Joannopoulos et al. | |
| 2010/0133918 A1 | 6/2010 | Joannopoulos et al. | |
| 2010/0133919 A1 | 6/2010 | Joannopoulos et al. | |
| 2010/0133920 A1 | 6/2010 | Joannopoulos et al. | |
| 2010/0171370 A1 | 7/2010 | Karalis et al. | |
| 2010/0181844 A1 | 7/2010 | Karalis et al. | |
| 2010/0187911 A1 | 7/2010 | Joannopoulos et al. | |
| 2010/0201205 A1 | 8/2010 | Karalis et al. | |
| 2010/0207458 A1 | 8/2010 | Joannopoulos et al. | |
| 2010/0225175 A1 | 9/2010 | Karalis et al. | |
| 2010/0231053 A1 | 9/2010 | Karalis et al. | |
| 2010/0237706 A1 | 9/2010 | Karalis et al. | |
| 2010/0237707 A1 | 9/2010 | Karalis et al. | |
| 2010/0237708 A1 | 9/2010 | Karalis et al. | |
| 2010/0253152 A1 | 10/2010 | Karalis et al. | |
| 2010/0264745 A1 | 10/2010 | Karalis et al. | |
| 2012/0025761 A1 * | 2/2012 | Takada et al. | 320/108 |
| 2012/0242286 A1 | 9/2012 | Takada et al. | |

FOREIGN PATENT DOCUMENTS

| | | |
|---|---|---|
| AU | 2007349874 A2 | 10/2008 |
| AU | 2010200044 A1 | 1/2010 |
| CA | 2 615 123 A1 | 1/2007 |
| CA | 2 682 284 A1 | 10/2008 |
| CN | 101258658 A | 9/2008 |
| CN | 101682216 A | 3/2010 |
| CN | 101860089 A | 10/2010 |
| EP | 0 788 212 A2 | 8/1997 |
| EP | 1 902 505 A2 | 3/2008 |
| EP | 2 130 287 A1 | 12/2009 |
| IN | 735/DELNP/2008 | 5/2008 |
| IN | 6195/DELNP/2009 | 7/2010 |
| JP | A-07-039077 | 2/1995 |
| JP | A-10-322920 | 12/1998 |
| JP | A-2009-501510 | 1/2009 |
| JP | A-2009-106136 | 5/2009 |
| KR | 2008-0031398 A | 4/2008 |
| KR | 2010-0015954 A | 2/2010 |
| WO | WO 2007/008646 A2 | 1/2007 |
| WO | WO 2008/118178 A1 | 10/2008 |

OTHER PUBLICATIONS

International Search Report issued in Application No. PCT/JP2009/071371; Dated Mar. 9, 2010 (With Translation).

Notice of Allowance issued in U.S. Appl. No. 13/132,240 dated Feb. 27, 2012.

Sep. 14, 2012 Office Action issued in U.S. Appl. No. 13/492,317.

Dec. 19, 2012 Notice of Allowance issued in U.S. Appl. No. 13/492,317.

* cited by examiner

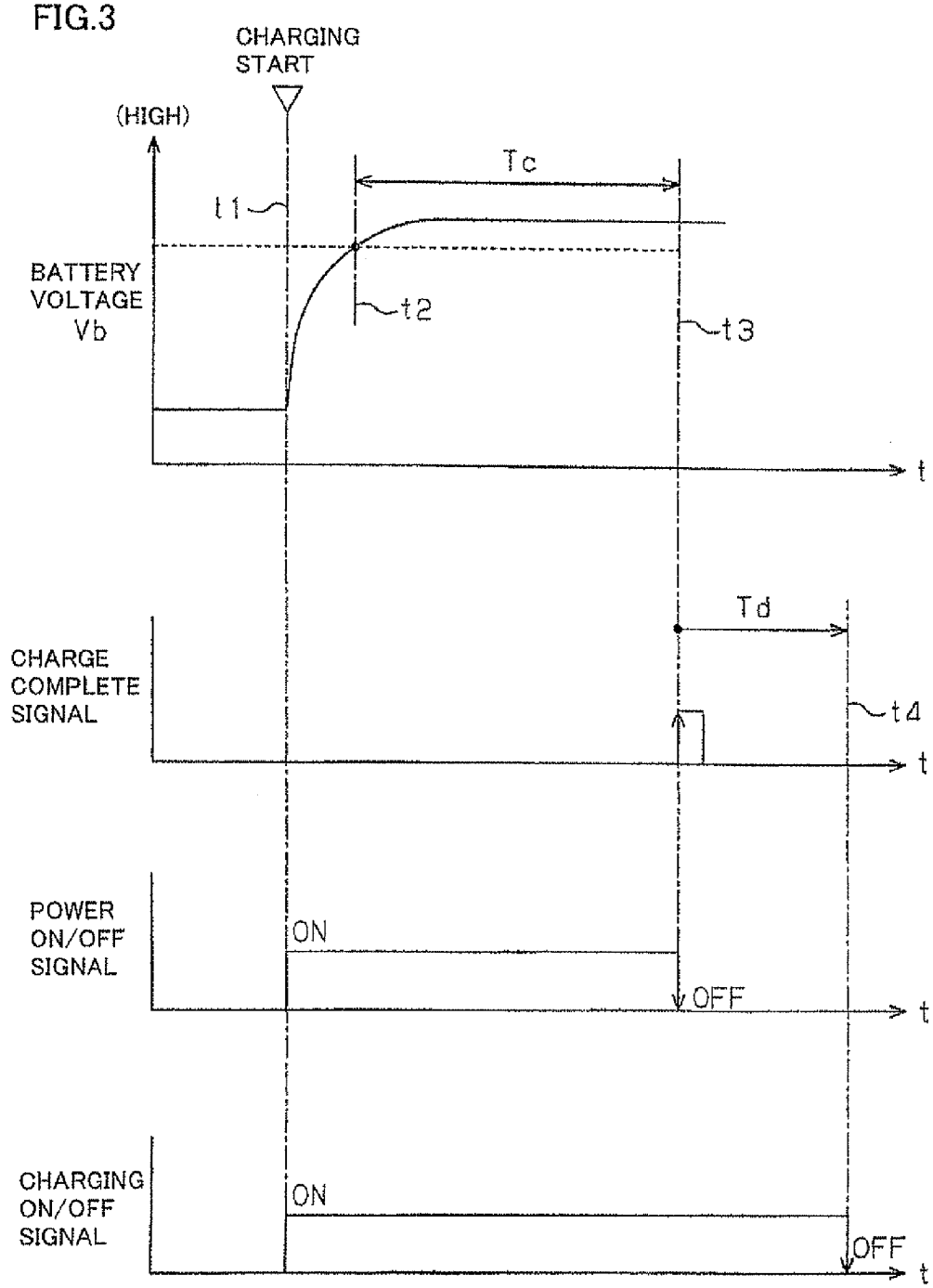

RESONANCE TYPE NON-CONTACT CHARGING DEVICE

This is a Continuation of application Ser. No. 13/132,240 filed Jun. 1, 2011, which in turn is a National Phase of Application No. PCT/JP2009/071371 filed Dec. 24, 2009. The disclosure of the prior applications is hereby incorporated by reference herein in its entirety.

TECHNICAL FIELD

The present invention relates to a resonance type non-contact charging device.

BACKGROUND ART

Patent Document 1, for example, discloses a power transmission system of the resonance scheme transmitting electric power wirelessly from a primary side resonant coil at the power transmission side towards a secondary side resonant coil at the power reception side arranged apart from the primary side resonant coil. Specifically, according to the power transmission system, development of an AC electric field by the primary side resonant coil through the AC voltage from a high frequency power source causes development of an oscillating magnetic field in the proximity of the primary side resonant coil. Electric power is transferred from the primary side resonant coil to the secondary side resonant coil by a resonance phenomenon.

PRIOR ART DOCUMENT

Patent Document

Patent Document 1: WO/2007/008646

SUMMARY OF THE INVENTION

Problems to be Solved by the Invention

When the power transmission system is applied to a resonance type non-contact charging device, a high frequency power source and a primary side resonant coil must be provided at the power transmission side, whereas a secondary side resonant coil and a charger must be provided at the power reception side. Since the power transmission system is of the high frequency transmission scheme, stopping the charger before stopping the high frequency power source will cause a portion of or all of the power transmitted from the primary side resonant coil to the secondary side resonant coil to be reflected towards the high frequency power source, leading to the possibility of the high frequency power source being damaged. Moreover, stopping the charger before stopping the high frequency power source will cause sudden increase in the input voltage to the charger (output voltage of the resonance system), leading to the possibility of the charger being damaged.

An object of the present invention is to provide a resonance type non-contact charging device that can prevent incurring damage when charging is stopped.

Means for Solving the Problems

To achieve the aforementioned object, a resonance type non-contact charging device according to the present invention includes a high frequency power source, a primary side resonant coil, a secondary side resonant coil, a charger, a secondary battery, and a stop control unit. The primary side resonant coil receives supply of high frequency electric power from the high frequency power source. The secondary side resonant coil is arranged apart from the primary side resonant coil in a non-contact manner. The secondary side resonant coil receives electric power from the primary side resonant coil through the magnetic field resonance between the primary side resonant coil and secondary side resonant coil. The charger receives supply of high frequency electric power from the secondary side resonant coil. The secondary battery is connected to the charger. The stop control unit stops the high frequency power source before stopping the charger when charging is to be stopped.

BRIEF DESCRIPTION OF THE DRAWINGS

FIG. 3 is a timing chart to describe the function of the resonance type non-contact charging device of FIG. 1.

MODES FOR CARRYING OUT THE INVENTION

Figure 1:
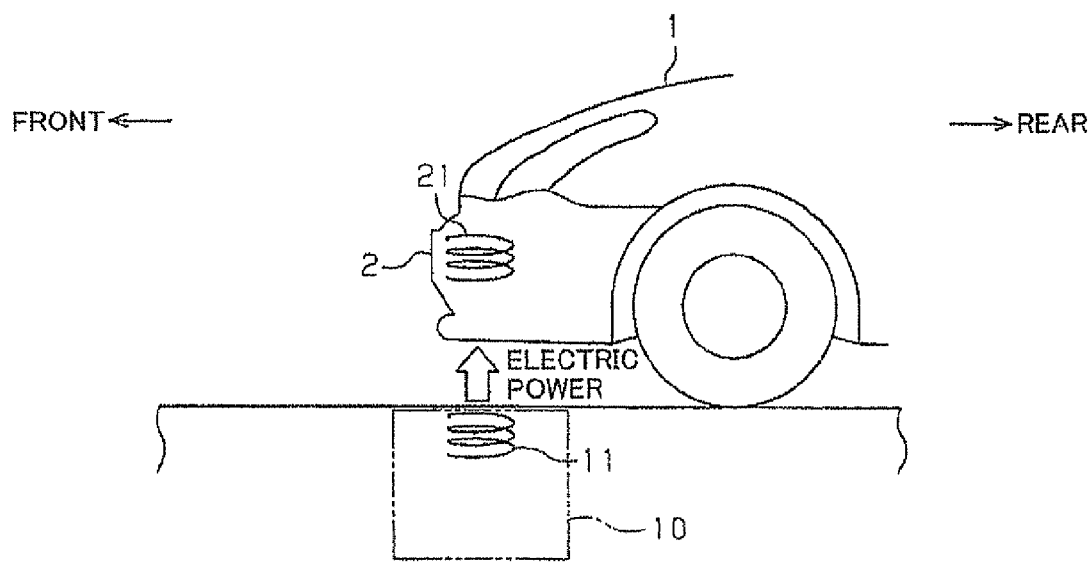
FIG. 1 is a schematic diagram of a configuration of an automobile to which the resonance type non-contact charging device according to an embodiment of the present invention is applied.

A resonance type non-contact charging device according to an embodiment of the present invention will be described hereinafter according to FIGS. 1-3.

The resonance type non-contact charging device of the present embodiment is applied to a charging system for a battery (secondary battery) mounted on a hybrid vehicle, i.e. a charging device to charge a vehicle-mounted battery. As shown in FIG. 1, a secondary side resonant coil 21 is attached at the front side of the car body, inside the front bumper, for example, in a vehicle 1. Secondary side resonant coil 21 is constituted of a copper wire wound in helical form. Secondary side resonant coil 21 is arranged in the front bumper such that the axis line (central axis of helix) of secondary side resonant coil 21 is consistent with the vertical direction of the vehicle.

A ground side apparatus 10 is embedded in the floor of a charging station where charging of battery 25 of automobile 1 is to be carried out. Ground side apparatus 10 includes a primary side resonant coil 11. Primary side resonant coil 11 is constituted of a copper wire wound in helical form. Primary side resonant coil 11 is arranged such that the axis line (central axis of helix) of primary side resonant coil 11 is orthogonal to the ground. When battery 25 of automobile 1 is to be charged at a charging station, automobile 1 is situated at the charging station such that the axis line (central axis of helix) of primary side resonant coil 11 is consistent with or adjacent the axis line (central axis of helix) of secondary side resonant coil 21.

Figure 2:
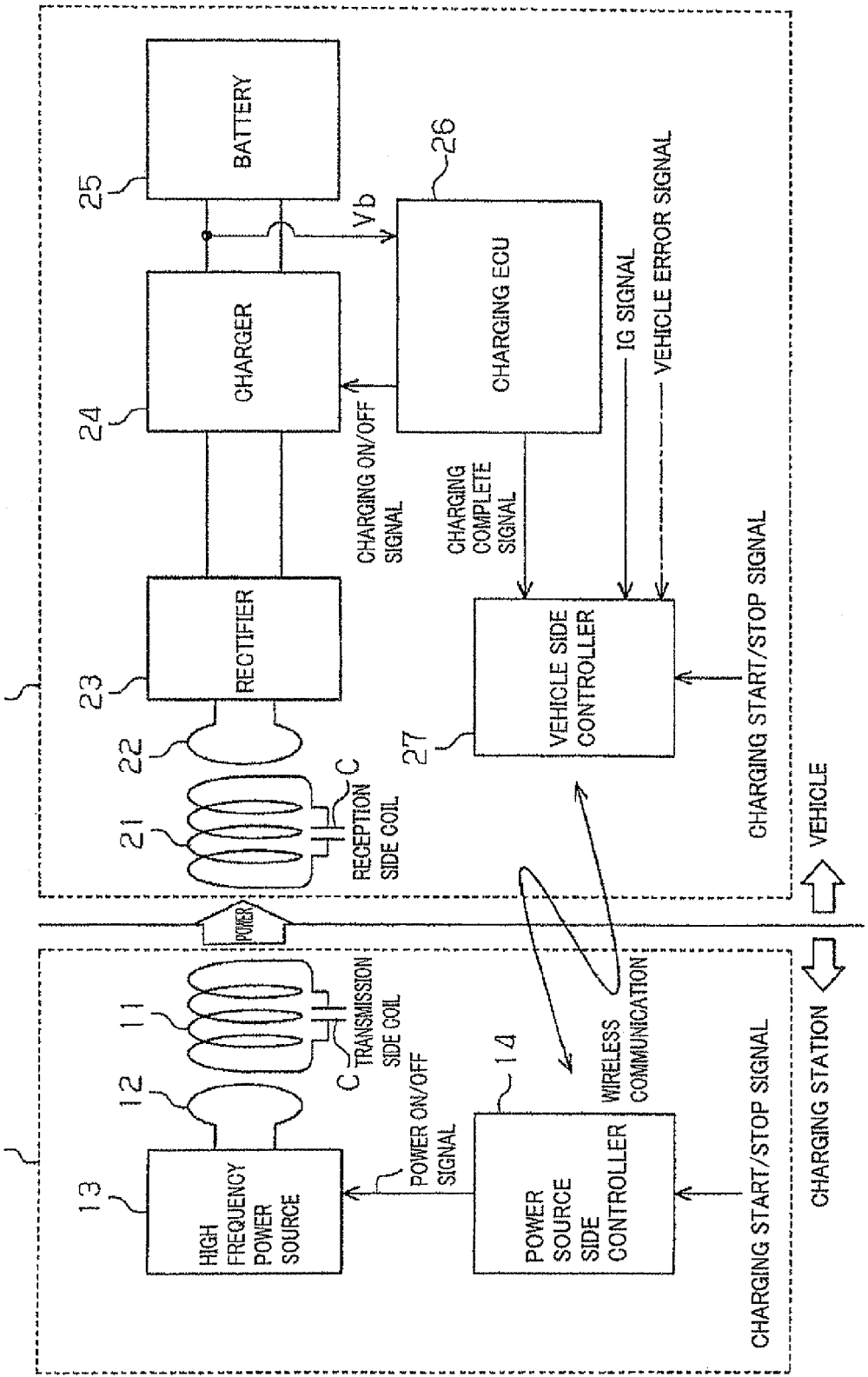
FIG. 2 is a circuit configuration diagram representing the electrical configuration of the resonance type non-contact charging device of FIG. 1.

FIG. 2 represents an entire configuration of a resonance type non-contact charging device. Ground side apparatus 10 includes a primary side resonant coil 11, a primary coil 12, a high frequency power source (AC source) 13, and a power source side controller 14 as a primary side control unit. An in-vehicle side apparatus 20 is mounted on the vehicle. In-vehicle side apparatus 20 includes a secondary side resonant coil 21, a secondary coil 22, a rectifier 23, a charger 24, a battery 25 that is a secondary battery, a charging ECU 26 as a secondary side control unit, and a vehicle side controller 27 as a secondary side control unit.

High frequency power source 13 outputs high frequency electric power of approximately several MHz, for example. Primary coil 12 is connected to high frequency power source 13. When high frequency power source 13 supplies electric power of high frequency to primary coil 12, primary side resonant coil 11 is coupled with primary coil 12 by electromagnetic induction. As a result, electric power is transmitted from primary coil 12 to primary side resonant coil 11. Thus, primary side resonant coil 11 receives supply of high frequency electric power from high frequency power source 13 via primary coil 12. In other words, high frequency electric power is supplied from high frequency power source 13 to primary side resonant coil 11 through primary coil 12. A capacitor C is connected to primary side resonant coil 11.

Power source side controller 14 is connected to high frequency power source 13. Power source side controller 14 transmits a power on/off signal to high frequency power source 13 to turn on or off high frequency power source 13. Power source side controller 14 receives a charging start/stop signal. The charging start/stop signal is associated with a switching operation by an individual at the ground side to start/stop charging.

Secondary side resonant coil 21 is arranged apart from primary side resonant coil 11 in a non-contact manner. Secondary side resonant coil 21 receives high frequency electric power from primary side resonant coil 11 through the magnetic field resonance between primary and secondary side resonant coils 11 and 21. Secondary coil 22 is coupled with secondary side resonant coil 21 through electromagnetic induction. As a result, electric power is transmitted from secondary side resonant coil 21 to secondary coil 22. Rectifier 23 is connected to secondary coil 22. Rectifier 23 rectifies electric power received at secondary coil 22. A capacitor C is connected to secondary side resonant coil 21.

A charger 24 is connected to rectifier 23. Charger 24 boosts the electric power rectified at rectifier 23, for example. Charger 24 includes a switching element. By the on/off control of the switching element, the output voltage and output current from charger 24 is adjusted. Battery 25 is connected to charger 24. Battery 25 is charged with the output electric power from charger 24.

Charging ECU 26 is connected to charger 24. In a charging mode of battery 25, charging ECU 26 controls the switching element of charger 24 while monitoring the output current and output voltage from charger 24. A charging on/off signal is sent from charging ECU 26 to charger 24, which causes charger 24 to be turned on/off. Charging ECU 26 senses battery voltage Vb. Vehicle side controller 27 is connected to charging ECU 26. A charging complete signal is transmitted from charging ECU 26 to vehicle side controller 27. Vehicle side controller 27 receives an ignition signal and a charging start/stop signal. The ignition signal is directed to operating the ignition switch of the vehicle. The charging start/stop signal is associated with a switching operation made by a passenger on the vehicle to start/stop charging.

Power source side controller 14 of ground side apparatus 10 and vehicle side controller 27 of in-vehicle side apparatus 20 can communicate with each other wirelessly.

An operation of the resonance type non-contact charging device configured as set forth above will be described based on the timing chart of FIG. 3.

Referring to FIG. 3, a person on ground or a passenger on the vehicle turns on the charging start switch at a timing indicated by O. In response, a charging start signal is sent to power source side controller 14 or vehicle side controller 27. Power source side controller 14 and vehicle side controller 27 share the on-operation information of the charging start switch through wireless communication. Power source side controller 14 outputs a power on/off signal of an H level to high frequency power source 13. Specifically, power source side controller 14 outputs a power source ON command to high frequency power source 13. Vehicle side controller 27 outputs a charging start command to charging ECU 26. In response, charging ECU 26 outputs a charging on/off signal of an H level to charger 24. In other words, charging ECU 26 outputs a charging ON command to charger 24.

In response, charger 24 initiates charging, whereby battery voltage Vb is boosted, When battery voltage Vb arrives at a preset threshold value (the timing indicated by t2 in FIG. 3), charging ECU 26 initiates a time count operation. At an elapse of a predetermined charging time Tc (the timing indicated by t3 in FIG. 3) from the time of exceeding the threshold value, charging ECU 26 determines that the charging of battery 25 is completed, and outputs a charging complete signal to vehicle side controller 27.

Upon receiving a charging complete signal from charging ECU 26, vehicle side controller 27 notifies power source side controller 14 that charging has been completed through wireless communication. In response, power source side controller 14 immediately outputs a power on/off signal of an L level to high frequency power source 13. In other words, power source side controller 14 outputs a power source off command to high frequency power source 13. Accordingly, high frequency power source 13 is stopped.

At an elapse of a predetermined delay time Td (the timing indicated by t4 in FIG. 3) from the elapse of predetermined charging time Tc (the timing indicated by t3 in FIG. 3), charging ECU 26 outputs a charging on/off signal of an L level to charger 24. In other words, charging ECU 26 outputs a charging off command to charger 24. Accordingly, charger 24 is stopped.

Thus, power source side controller 14, vehicle side controller 27 and charging ECU 26 cooperate with each other such that charger 24 that is a device at the secondary side is stopped after high frequency power source 13 that is a device at the primary side is stopped when charging is to be stopped. In other words, when charging ECU 26 determines that charging is completed, first high frequency power source 13 is stopped, and then charger 24 is stopped.

Since the resonance type non-contact charging device is of the high frequency transmission scheme, stopping charger 24 before stopping high frequency power source 13 will cause a portion of or all of the electric power transmitted from the primary side resonant coil to the secondary side resonant coil to be reflected towards the high frequency power source, leading to the possibility of high frequency power source 13 being damaged. Specifically, the electric power reflected towards high frequency power source 13 is converted into heat, whereby high frequency power source 13 is overheated. Moreover, if charger 24 is stopped before high frequency power source 13 is stopped, the voltage at the input terminal of charger 24 will be boosted to damage charger 24. In the present embodiment, high frequency power source 13 that is a device at the primary side is stopped before charger 24 that is a device at the secondary side is stopped. Therefore, damage to high frequency power source 13 by reflected electric power can be prevented and the voltage at the input terminal of charger 24 will not be boosted.

The present embodiment has the following advantages.

(1) The resonance type non-contact charging device includes high frequency power source 13, primary side resonant coil 11, secondary side resonant coil 21, and charger 24, as well as stop control unit (power source side controller 14, vehicle side controller 27, and charging ECU 26). The stop control unit causes high frequency power source 13 to be stopped before charger 24 is stopped in a charging stop mode. Accordingly, when charging is to be stopped, high frequency power source 13 can be prevented from being damaged by reflected electric power, and charger 24 can be prevented from being damaged.

(2) The installation of high frequency power source 13 and primary side resonant coil 11 at the ground side and the installation of secondary side resonant coil 21, charger 24 and battery 25 in the vehicle are preferable from the standpoint of practical usage.

The present invention is not limited to the above-described embodiment, and may be embodied as set forth below.

When an error occurs at the charging system including charger 24 or at a vehicle system other than the charging system, similar procedures can be taken, i.e. stopping high frequency power source 13 first, and then stopping charger 24. Specifically, when a vehicle error signal or the like is applied to vehicle side controller 27 of FIG. 2, i.e. when a system error occurs, vehicle side controller 27 stops high frequency power source 13 previous to stopping charger 24. A vehicle error signal is output when there is an error such as a breakdown, for example, when the battery is overheated, or when vehicle side controller 27 or otherwise vehicle-mounted controller is overheated.

Likewise, when an ignition switch, a charging stop switch, or the like is operated, similar procedures can be taken, i.e. stopping high frequency power source 13 first, and then stopping charger 24.

Although the resonance type non-contact charging device is applied to a hybrid vehicle, the resonance type non-contact charging device may be applied to a vehicle other than a hybrid vehicle, as well as to a charging device used other than for a vehicle.

Primary side resonant coil 11 and secondary side resonant coil 21 are not restricted to the form of an electric wire wound helically, and may be wound in flat spiral. In this case, the length of the coil in the axial direction is reduced, allowing a smaller depth for the hole to be formed in the ground.

The profile of primary side resonant coil 11, primary coil 12, secondary side resonant coil 21 and secondary coil 22 is not limited to a circle, and may take, for example, a polygonal shape such as a rectangle, hexagon, triangle, or an ellipse.

Capacitor C connected to each of primary side resonant coil 11 and secondary side resonant coil 21 is dispensable. However, a configuration with both capacitors C connected can reduce the resonant frequency, as compared to the case where capacitors C are absent. Primary side resonant coil 11 and secondary side resonant coil 21 can also be reduced in size, as compared to the case where capacitors C are absent, based on the same resonant frequency.

The invention claimed is:

1. A non-contact power reception device that receives electric power from a power transmission device having a primary side coil receiving electric power from a power source, the non-contact power reception device comprising:
    a secondary side coil configured to receive electric power from the primary side coil through a magnetic field;
    a charger configured to receive the electric power received at the secondary side coil; and
    a control unit configured to stop the charger after the power source is stopped when charging is to be stopped.

2. The non-contact power reception device according to claim 1, wherein when charging is to be stopped, the control unit stops the charger a predetermined time after the power source is stopped.

3. The non-contact power reception device according to claim 1, wherein the secondary side coil and the charger are mounted on a vehicle.

4. The non-contact power reception device according to claim 3, wherein the secondary side coil and the charger are mounted at a front side of the vehicle.

5. The non-contact power reception device according to claim 4, wherein the secondary side coil and the charger are mounted inside a bumper of the vehicle.

6. The non-contact power reception device according to claim 3, wherein a central axis of the secondary side coil is parallel to a vertical direction of the vehicle.

7. The non-contact power reception device according to claim 1, wherein the secondary side coil is formed of a copper wire.

8. The non-contact power reception device according to claim 1, wherein the secondary side coil is wound in a helical form.

9. The non-contact power reception device according to claim 4, wherein the secondary side coil is wound in a helical form.

10. The non-contact power reception device according to claim 9, wherein a central axis of the secondary side coil is parallel to a vertical direction of the vehicle.

11. The non-contact power reception device according to claim 1, further comprising a rectifier connected to the secondary side coil.

12. The non-contact power reception device according to claim 11, wherein the charger is connected to the rectifier.

13. The non-contact power reception device according to claim 1, further comprising a battery connected to the charger.

14. The non-contact power reception device according to claim 1, further comprising a capacitor connected to the secondary side coil.

15. The non-contact power reception device according to claim 13, wherein charging is stopped when the battery is fully charged.

16. The non-contact power reception device according to claim 1, wherein charging is stopped by at least one of a charging stop switch, an error signal, and an ignition switch.

17. The non-contact power reception device according to claim 1, wherein the secondary side coil is wound as a flat spiral.

18. The non-contact power reception device according to claim 1, wherein the secondary side coil is formed as one of a circle, a rectangle, a hexagon, a triangle, and an ellipse.

19. A non-contact power reception device that receives electric power from a power transmission device, the non-contact power reception device comprising:
    a secondary side coil configured to receive electric power from a power transmission device through a magnetic field;
    a charger configured to receive the electric power received at the secondary side coil; and
    a control unit configured to stop the charger after the power transmission device is stopped when charging is to be stopped.

* * * * *